(12) United States Patent
Drössler et al.

(10) Patent No.: US 7,025,375 B2
(45) Date of Patent: Apr. 11, 2006

(54) AIR-BAG ARRANGEMENT AND A METHOD OF INFLATING AN AIR-BAG

(75) Inventors: Norbert Drössler, München (DE); Jan-Erik Kållhammer, Linköping (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/168,088

(22) PCT Filed: Dec. 15, 2000

(86) PCT No.: PCT/SE00/02545

§ 371 (c)(1),
(2), (4) Date: Aug. 30, 2002

(87) PCT Pub. No.: WO01/44028

PCT Pub. Date: Jun. 21, 2001

(65) Prior Publication Data

US 2003/0107204 A1    Jun. 12, 2003

(30) Foreign Application Priority Data

Dec. 16, 1999  (GB) .................................... 9929796

(51) Int. Cl.
*B60R 21/22*   (2006.01)
*B60R 21/24*   (2006.01)
*D03D 11/00*   (2006.01)

(52) U.S. Cl. ................ 280/729; 280/730.2; 280/743.1; 139/387 R; 442/205; 442/206; 442/207; 428/34.1; 428/34.3; 428/34.5; 428/34.6

(58) Field of Classification Search ................ 280/729, 280/730.2, 743.1; 442/205–207; 139/384 R, 139/386, 387 R, 389, 390; 428/34.1, 34.3, 428/34.5, 34.6
See application file for complete search history.

(56) References Cited

U.S. PATENT DOCUMENTS

| | | | | |
|---|---|---|---|---|
| 3,598,159 A * | 8/1971 | MacIntyre | ............... | 139/384 R |
| 5,011,183 A * | 4/1991 | Thornton et al. | ........ | 280/743.1 |
| 5,464,250 A | 11/1995 | Sato | | |
| 5,651,395 A * | 7/1997 | Graham et al. | ............. | 139/390 |
| 5,797,621 A * | 8/1998 | Ono | ........................ | 280/730.2 |
| 5,845,935 A * | 12/1998 | Enders et al. | ............ | 280/743.2 |
| 5,865,465 A * | 2/1999 | Bauer et al. | ............. | 280/743.1 |
| 5,975,564 A * | 11/1999 | Smith et al. | ................ | 280/729 |
| 6,010,149 A * | 1/2000 | Riedel et al. | ............ | 282/730.2 |

(Continued)

FOREIGN PATENT DOCUMENTS

EP    0 849 129 A1    6/1998

(Continued)

*Primary Examiner*—Paul N. Dickson
*Assistant Examiner*—Laura B. Rosenberg
(74) *Attorney, Agent, or Firm*—Venable LLP; Robert Kinberg; Catherine M. Voorhees (57) ABSTRACT

An air-bag arrangement provides protection for the occupant of a motor vehicle. The air-bag arrangement incorporates an airbag (50) formed by two layers (51, 52) interconnected to form a first set of chambers (53, 54, 55, 56, 57, 58), having a plurality of elongated substantially parallel chambers. A further fabric layer (61) is connected to one of the two layers (52) forming the main part of the inflatable element to define a second chamber set including two chambers (62, 63). The chambers are off-set from the adjacent chambers (54, 55, 56) defined by the first two layers (51, 52). Apertures (59, 60) provided in the layer (52) allow for the inflation of the second set of chambers (62, 63).

15 Claims, 4 Drawing Sheets

U.S. PATENT DOCUMENTS

| | | | |
|---|---|---|---|
| 6,042,141 A * | 3/2000 | Welch et al. | 280/729 |
| 6,059,312 A * | 5/2000 | Staub et al. | 280/729 |
| 6,152,481 A * | 11/2000 | Webber et al. | 280/730.2 |
| 6,168,191 B1 * | 1/2001 | Webber et al. | 280/730.2 |
| 6,220,309 B1 * | 4/2001 | Sollars, Jr. | 139/389 |
| 6,299,965 B1 * | 10/2001 | Keshavaraj | 428/125 |
| 2001/0042980 A1 * | 11/2001 | Sollars, Jr. | 280/743.1 |
| 2003/0042716 A1 * | 3/2003 | Fujiwara | 280/730.2 |

FOREIGN PATENT DOCUMENTS

| | | |
|---|---|---|
| EP | 0 861 762 A1 | 9/1998 |
| GB | 2 297 950 A | 8/1996 |
| GB | 2 324 068 A | 10/1998 |

* cited by examiner

AIR-BAG ARRANGEMENT AND A METHOD OF INFLATING AN AIR-BAG

BACKGROUND OF THE INVENTION

The present invention relates to an air-bag arrangement, and more particularly relates to an air-bag arrangement adapted to provide protection for an occupant of a motor vehicle in the event that a side impact or roll-over situation should occur.

It has been proposed previously to provide an air-bag arrangement incorporating an inflatable element initially stored in a recess or housing which extends above the side door openings of a motor vehicle, the inflatable element being adapted to be inflated to occupy a position between the occupant of the vehicle and the side doors of the vehicle. Thus the inflatable element can be considered to constitute an inflatable curtain.

Inflatable elements of this type are disclosed in GB 2,297,950 A. This specification teaches an inflatable element formed of two adjacent sheets of fabric which are interconnected by seams to form a plurality of cells. The configuration of the inflatable element is such that, as the inflatable element becomes inflated, the cells take on a substantially cylindrical configuration and a line of tension is created so that the inflatable element is held substantially rigidly in position.

It is important that the inflatable element should be deployed very swiftly in response to a signal from a sensor indicating that a side impact, or a roll-over situation exists. It is also important, especially in a roll-over situation, that the inflatable element should be maintained in the inflated state for a relatively long period of time.

It is to be understood that, in a side impact or roll-over situation, the side window of a vehicle may break. Parts of a broken window may damage an airbag which is located immediately adjacent that window, and the air-bag may then lose gas and become deflated. This is clearly disadvantageous.

SUMMARY OF THE INVENTION

The present invention seeks to provide an improved air-bag arrangement of the type discussed above.

According to this invention there is provided an air-bag arrangement for use in a motor vehicle to provide protection for the occupant of the motor vehicle, the air-bag arrangement incorporating an air-bag adapted, on inflation, to be located adjacent an occupant of a vehicle, the air-bag comprising at least three super-imposed layers, each layer being connected to the or each adjacent layer to define a respective chamber set, at least one of the chamber sets incorporating a plurality of chambers, the chambers of one chamber set being off-set relative to the chamber or chambers of another chamber set, means being provided to supply gas to the chamber sets.

Preferably a first outer layer is connected to an intermediate layer to define a plurality of chambers constituting said one chamber set, and a second outer layer is connected to the intermediate layer to define at least one chamber forming a second chamber set.

Conveniently the means to supply gas to the chamber sets comprises at least a first gas duct in communication with one of the chamber sets Preferably the means to supply gas additionally comprise a second gas duct to supply gas to a second chamber set.

Conveniently the means to supply gas to a chamber set comprise a region of an intermediate layer which is adapted to permit a flow of gas from a chamber set which is receiving gas to an adjacent chamber set which is to receive the gas.

In one embodiment the intermediate layer is provided, within said region, with an aperture.

In an alternative embodiment the intermediate layer is permeable to high pressure gas within said region.

In a further alternative embodiment the intermediate layer is adapted to rupture or break within said region when subjected to a high pressure of gas.

Preferably at least the outer layers are formed of fabric.

Conveniently the or each layer located between the outer layers is of fabric.

Advantageously the air-bag is fabricated using a one-piece weaving technique.

In an alternative embodiment the or each layer intermediate the outer layers is formed of foil.

Preferably the chambers of one chamber set are elongate and generally parallel.

Conveniently the chambers of a second chamber set are elongate and parallel and are off-set from the chambers of the first chamber set.

Preferably the air-bag is provided with fixing means adapted to fix the air-bag to part of a motor vehicle extending above the side doors of the vehicle, the cells being located to extend generally transversely of an intended line of tension extending across part of the air-bag.

Conveniently the air-bag is provided with an extending strap adapted to be connected to an anchoring point on the vehicle, said line of tension extending from that anchoring point to one of said fixing means.

Advantageously the air-bag has a substantially rectangular portion accommodating said chamber sets and an extension, the extension constituting a gas supply duct adapted to supply gas.

The invention also relates to a method of inflating an air-bag as described above comprising the steps of initially inflating a first chamber set, and subsequently inflating a second chamber set.

In one preferred embodiment of the invention the air-bag, when inflated, provides a uniform degree of protection across a selected area. In a conventional air-bag, which may be divided into a plurality of cells, formed from simply two layers of fabric, there are portions between adjacent cells where seams are located. If part of an occupant of a vehicle strikes the region of the air-bag where a seam is located, the air-bag may provide only a minimum cushioning effect, or an insufficient cushioning effect. In preferred embodiments of the invention, where the chambers of the first chamber set are off-set relative to the chambers of the second chamber set, there is no region where there is simply a seam to be located between the occupant of the vehicle and the vehicle itself. Thus an improved protection is provided.

Another advantage of an air-bag in accordance with the present invention is that if a window located adjacent the air-bag should break, with parts of the broken window damaging the air-bag, so that the air-bag loses gas, it will only be the set of chambers adjacent the window that lose gas, and the air-bag will still have at least one further set of chambers to provide a reasonable degree of protection for the occupant of the vehicle.

A further advantage obtained by use of a preferred embodiment of the invention is that the layers of fabric utilised to form the air-bag, especially the intermediate layer or layers may have less coating than is normally provided to ensure that the fabric is substantially gas-tight, or even no coating at all. Because the inflatable element can, if designed appropriately, be subjected to a two-step inflation process, the coating may not be required. This can be advantageous since the coating can be relatively expensive.

A further advantage is that the chamber sets may be inflated sequentially, thus prolonging the period of time during which the air-bag remains inflated.

A further advantage is that a first chamber set may have a relatively small volume, thus enabling the air-bag to be deployed swiftly. A second chamber set, constituted by chambers located where protection is required (for example adjacent to the head of an occupant of the vehicle) may then be inflated—for example through a vent from the first chamber set—so that the second chamber set is also inflated within a relatively short period of time.

In order that the invention may be more readily understood, and so that further features thereof may be appreciated, the invention will now be described, by way of example, with reference to the accompanying drawings in which:

DETAILED DESCRIPTION OF THE PREFERRED EMBODIMENT

Figure 1:
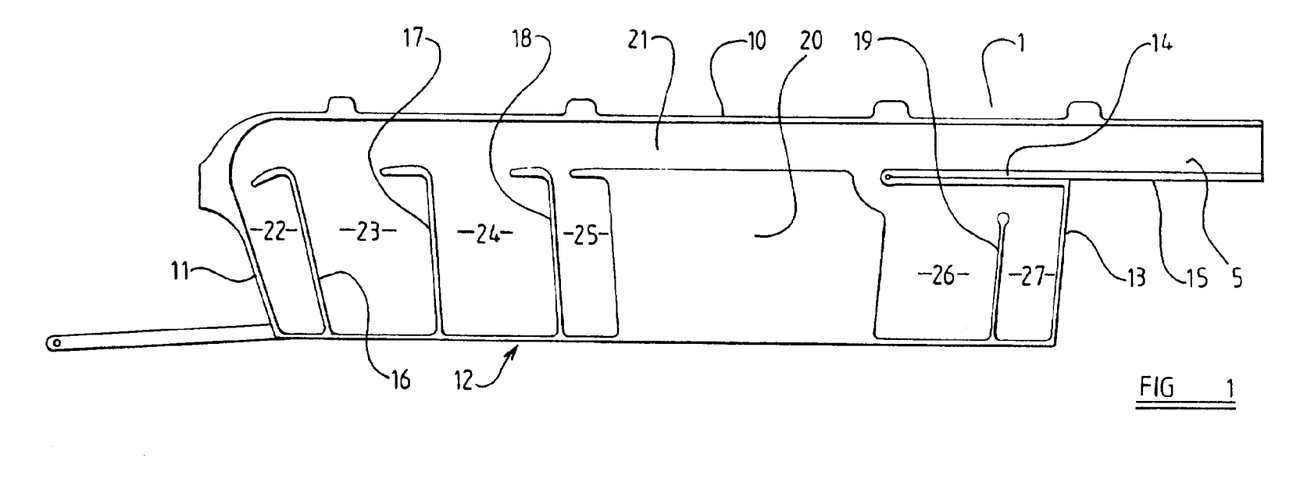
FIG. 1 illustrates a first outer fabric layer utilized in forming an air-bag, illustrating the pattern of seams used to secure the outer layer to an intermediate layer.
Figure 2:
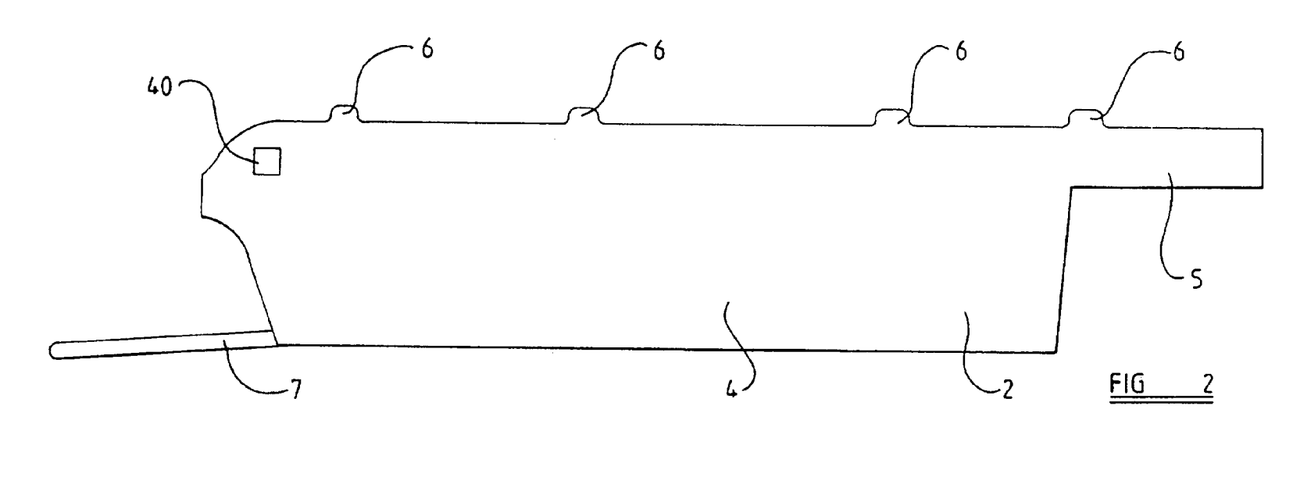
FIG. 2 is a view of the intermediate layer, not showing any stitching.
Figure 3:
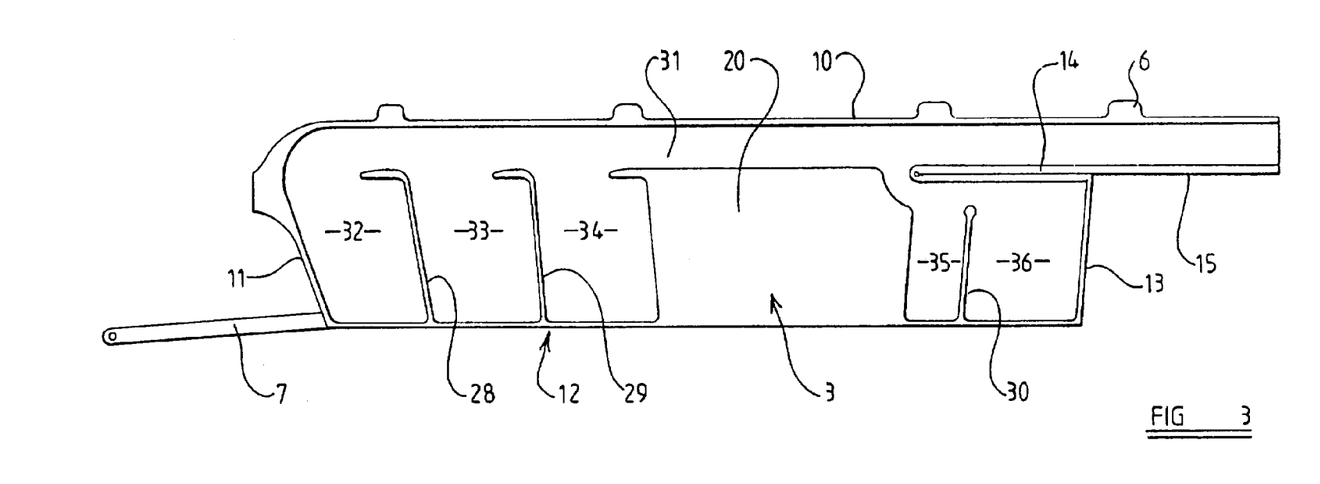
FIG. 3 is a view corresponding to FIG. 1 illustrating an outer layer which is located on the opposite side of the intermediate layer to the layer of FIG. 1, again showing the pattern of seams used to secure the outer layer to an intermediate layer.

Referring initially to FIGS. 1, 2 and 3, an air-bag is fabricated from three layers of fabric. A first outer layer 1 of fabric is illustrated in FIG. 1. A second intermediate layer 2 of fabric is illustrated in FIG. 2, and a third outer layer 3 of fabric is illustrated in FIG. 3. The layers of fabric will be located with the two outer layers 1 and 3 on opposite sides of the intermediate layer 2.

The three layers 1, 2 and 3 each have a substantially identical outer shape. As can be seen most clearly in FIG. 2, each fabric layer comprises a central generally rectangular region 4. This region, as will be described hereinafter, helps define inflatable cells. An extension 5 extends from the top right-hand corner of the generally rectangular region 4 of each fabric layer, as shown in FIG. 2. The extension 5 of each fabric layer, as will become clear hereinafter, helps constitute a gas supply duct.

A plurality of projections 6 are provided extending across the upper part of the rectangular region 4 and the extension 5. These projections 6 form fixing lugs.

A further extension 7 in the form of a strap extends from the lower left-hand end of the rectangular region 4 of each fabric layer, as shown in FIG. 2. The extension 7, as will be described hereinafter, will constitute a tensioning strap.

FIG. 1 illustrates the first outer layer 1 of fabric, and shows the pattern of seams that will be used to interconnect that layer of fabric and the intermediate layer 2 of fabric, as shown in FIG. 2. For the purposes of explanation, it is to be understood that the first layer 1 of fabric will be located behind the intermediate layer 2 of fabric, and equally the third layer 3 of fabric will be located in front of the intermediate layer 2 of fabric.

Looking initially at the rear-most layer 1 of fabric, it can be seen that a seam 10 is provided which extends across the top of the layer 1 of fabric, across the extension 5 that forms the gas supply duct and the seam continues, as seam 11, down the left-hand side of the rectangular region 4. A seam 12 extends across the lower edge of the rectangular region, and continues as seam 13 up the right-hand side of the rectangular region 4. This seam then extends inwardly part way across the rectangular region as seam 14 in alignment with the lower edge of the extension 5. A seam 15 is provided across the lower edge of the extension 5. A plurality of substantially vertical seams are provided, such as seams 16, 17, 18, 19, which extend upwardly from the lower seam 12, but which terminate before the top seam 10.

In the described embodiment, the seams are formed by weaving together layers of fabric using a one-piece weaving technique and, in the described embodiment, in an area 20, which extends up from the lower-most seam 12, the layers are also woven together.

It can be understood that the configuration of seams, as described above, serves to define a gas flow duct 21 which extends adjacent the upper edge of the rectangular region 4, and a plurality of discrete chambers 22, 23, 24, 25, 26 and 27, all of which are in gas communication with the gas flow duct 21.

Considering now the outer layer 3 of fabric, as shown in FIG. 3, it can be seen that this layer 3 of fabric is also provided with seams 10 to 15, as described above. This layer 3 of fabric is provided with a plurality of seams 28, 29, 30 which extend upwardly from the lower-most seam 12 towards the top seam 10. Again the seams are formed by weaving the layers of fabric together and, again, there is an area 20 where the fabric of the layer 3 is woven together with the fabric of the intermediate layer, and also, as will be apparent, with the fabric of the first outer layer 1.

It is to be observed that the seams 28, 29 and 30 of the third outer layer of fabric 3 are laterally off-set from the seams 16, 17, 18 and 19 of the first outer layer 1 of fabric.

The outer layer 3 of fabric together with the intermediate layer 2 of fabric form a gas flow duct 31 which extends in alignment with the gas supply duct 5 across the top of the rectangular area 4, the gas flow duct 31 communicating with discrete chambers 32, 33, 34, 35 and 36 defined by the seams 28, 29, 30.

At least some of the seams may be mechanically weak, and thus are adapted to rupture. The intermediate layer may be provided with one or more regions 40 adapted to permit a flow of gas when subjected to a very high pressure of gas. The region 40 may be a region which is permeable to high pressure gas or may be a region which ruptures or breaks when subjected to high pressure. The region 40 may, in alternative designs, be replaced by permeable or rupturable seams to provide the same effect, or the region 40 may simply be provided with an aperture. The region 40 may be located at any convenient position, and may thus separate the two gas flow ducts, or may separate two adjacent chambers.

It is to be appreciated, therefore, that the three layers 1, 2 and 3 of fabric may be woven simultaneously and may be interconnected with the described seam patterns using a one-piece weaving technique to produce an air-bag which effectively comprises a first plurality of chambers constituting a first chamber set defined between one outer layer of fabric, and an intermediate layer of fabric, and a second discrete plurality of chambers forming a second chamber set defined between a second outer layer of fabric and the said intermediate layer of fabric.

Figure 4:
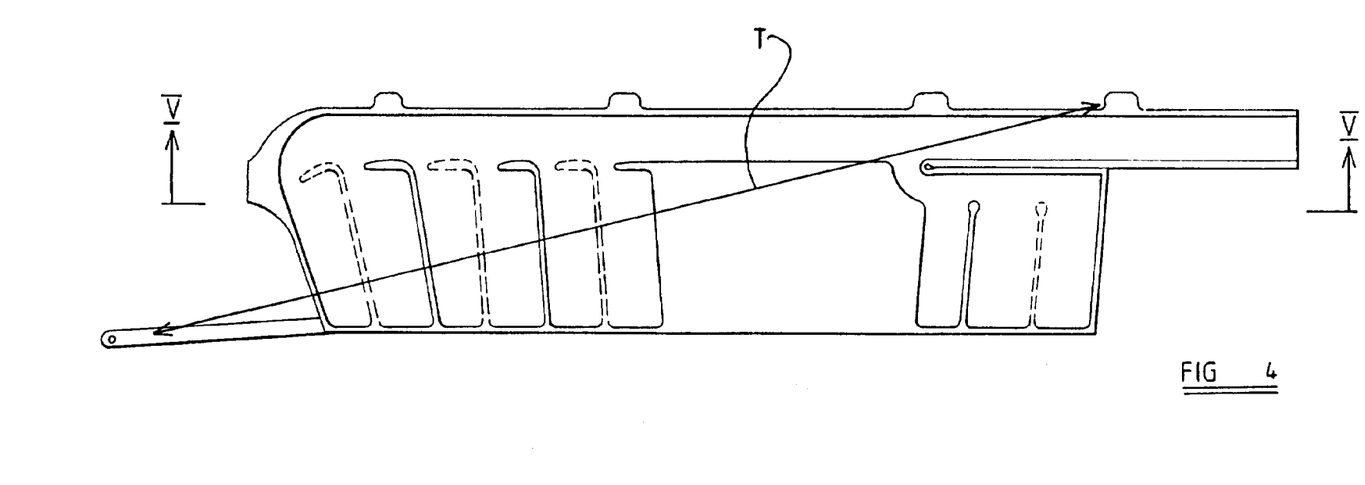
FIG. 4 is a view showing the assembled air-bag, the seams of one of the outer layers being shown in solid, since they will be visible, and the seams of the other layer being shown in phantom, since they will not be visible.

The chambers are configured to extend generally transversely to an intended tension line, shown as the line T in FIG. 4, which extends from the strap 7 to one of the fixing lugs 6 provided on the extension 5. In a modified arrangement a further strap may be provided at the right-hand lower corner of the rectangular region 4, and the line of tension may extend along this strap and also along the strap 7.

It is intended that the air-bag will be mounted in a motor vehicle with the lugs 6 being connected to points located above the door opening at the side of the vehicle strap formed by the extensions, with the strap extending to an anchoring point present, for example, on the "A"-Post of the vehicle.

It is envisaged that the air-bag described above will be utilized in connection with a gas generator assembly adapted to supply gas separately to the two discrete sets of chambers.

Figure 5:
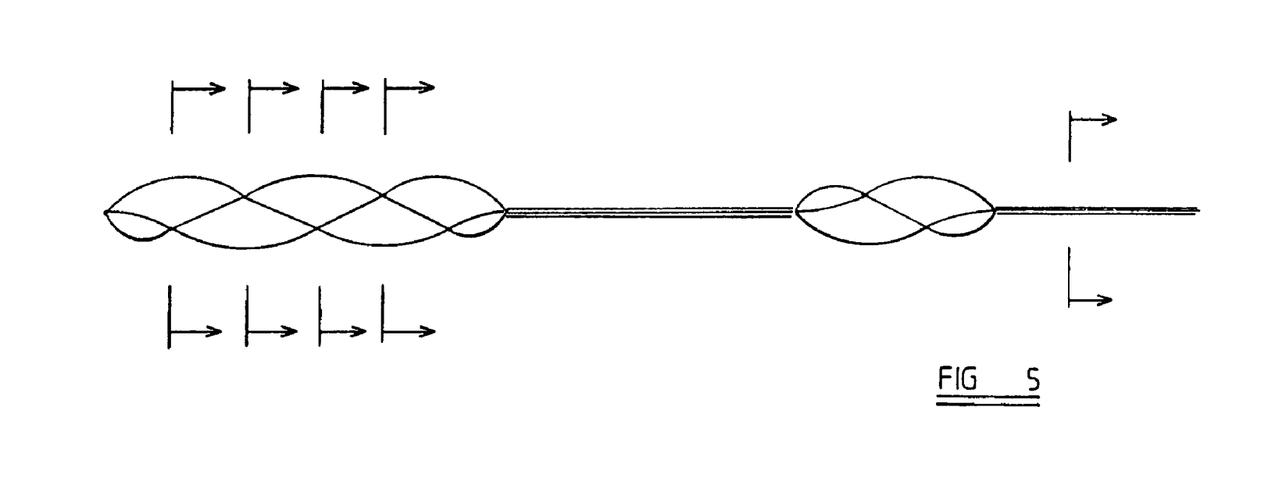
FIG. 5 is a sectional view taken on the line V—V of FIG. 4.
Figure 6:
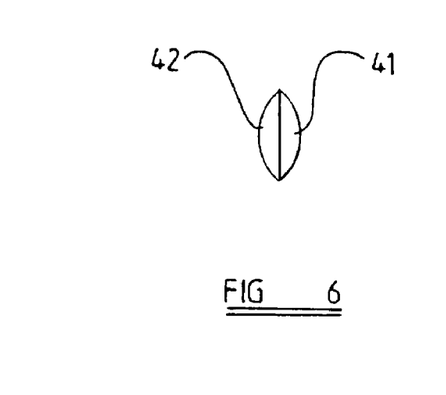
FIG. 6 is a plurality of sectional views taken on the lines shown in FIG. 5.

FIG. 5 illustrates the situation that exists when the air-bag has been inflated and, as can be seen from FIG. 6, the extension piece 5 is actually configured to define two gas supply ducts, namely a first gas supply duct 41, that communicates with the chambers 22, 23, 24, 25, 26, 27, and a second gas supply duct 42 that communicates with the chambers 32, 33, 34, 35, 36.

It is envisaged that gas may be supplied through one duct, such as the duct 41, in order rapidly to inflate the chambers associated with that duct, thus deploying the air-bag swiftly to its intended operative position. In many side impact situations it is important that an air-bag should be deployed as swiftly as possible to provide protection for the occupant of the vehicle. The chambers 22, 23, 24, 25, 26, 27 will thus become inflated reducing the length of the portion of the air-bag that extends between the anchoring point to which the strap 7 is connected and one of the lugs 6, such as a lug on the extension piece 5, creating the line of tension T. The axes of the cells extend transversely to the line of tension. The chambers 22, 23, 24, 25, 26, 27 may be designed to have a relatively small volume so that they may inflate relatively quickly, thus deploying the air-bag rapidly.

It is envisaged that, subsequently, gas may be supplied through the gas supply duct 42 to the chambers 32, 33, 34, 35, 36. These chambers, as they inflate, enhance the tensioning effect along the line of tension T. The effect of this will be to prolong the period of time during which the inflatable element is actually inflated. This is a desirable property of an inflatable element of this type, especially during a roll-over accident situation.

It is to be noted that because the seams interconnecting the first outer layer 1 of fabric and the intermediate layer 2 to form the first set of chambers are off-set from the seams joining the second outer layer 3 of fabric to the intermediate layer 2 to form the second set of chambers, the resultant chambers are off-set and substantially overlap each other, as can be seen most clearly from the sectional view of FIG. 5. Thus, regardless of which set of chambers is inflated, the air-bag will, in the areas where the cells are located, provide at least some degree of protection for an occupant of the vehicle. Of course, the degree of protection that is provided is optimum when both sets of chambers are inflated, since then there is no part of the region of the air-bag covered by the overlapping chambers that is not inflated. This is in contrast with the risk, if there is only a single set of chambers, that part of the occupant will hit the air-bag precisely where there is a seam between adjacent chambers, with the consequence that the air-bag does not provide adequate protection. Also, by the provision of two sets of chambers, and by the inflation of those chambers at different times, a satisfactory degree of protection may be provided over a relatively long period of time.

It is to be appreciated that if the air-bag, when inflated, is located adjacent a window which breaks, and if part of the broken window should damage the fabric of the air-bag that lies adjacent the window, only one set of chambers will be damaged. Thus, whilst that set of chambers may begin to deflate, the other set of chambers will still remain inflated to provide protection for the occupant of the vehicle.

It is possible that a sensor may be utilized which is adapted to sense specific parameters concerning an accident situation, and the time at which the two gas generators are activated may be dependent upon the sensed parameters.

The presence of the region 40 in the intermediate layer 5 is such that if a particularly high pressure of gas exists in one gas flow duct, and the associated chambers, (such as the gas flow duct 21 and the associated chambers 22, 23, 24, 25, 26 and 27) gas from that gas flow duct, or the associated chambers, may transfer to the other gas flow duct and assist in the inflation of the other set of chambers.

It is to be appreciated that the design of each of the outer layers 1, 3 of fabric may be modified independently to produce a range of products adapted for use with a range of motor vehicles.

Whilst, in the described embodiment, all three layers of fabric have the same configuration, it is to be appreciated that in modified embodiments, the three layers of fabric may have different configurations. Thus, it is conceivable that in one embodiment of the invention, one outer layer and the intermediate layer have the same configuration, and the second outer layer has a different configuration, being rather smaller than the first outer layer and the intermediate layer. This may facilitate the provision of relatively small cells, or a single cell, or a small number of cells, on one side of the intermediate layer which can be inflated very rapidly indeed, since the cell or cells will only contain a very small quantity of gas when fully inflated, thus enabling the airbag to be deployed to the operative position with extreme rapidity.

Figure 7:
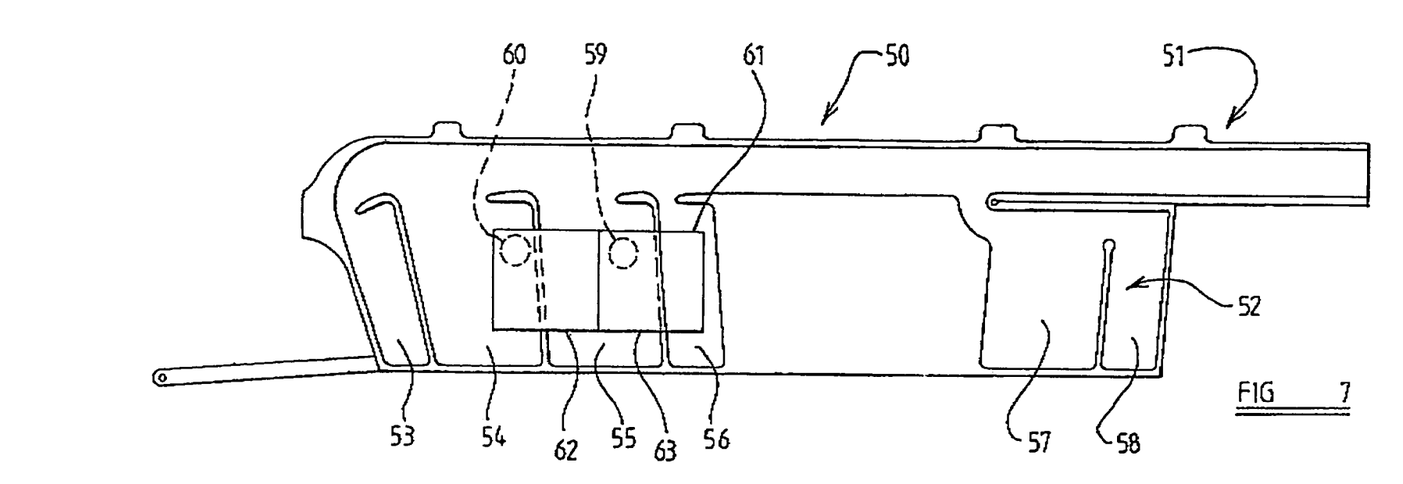
FIG. 7 is a perspective view of a modified embodiment of the invention.

Thus, as shown in FIG. 7, an air-bag 50 is shown in the inflated state. The air-bag 50 comprises a first outer layer 51 and an intermediate layer 52 which are of the same configuration and which are secured together by appropriate seams to define chambers, identified as chambers 53 to 58 which correspond with the chambers 22 to 27 formed between the outer layer 1, as shown in FIG. 1, and the associated intermediate layer 2, as shown in FIG. 2.

The intermediate layer of fabric 52 is provided with an aperture 59 in the wall of cell 55. A further aperture 60 is formed in the wall of cell 54.

A rectangular layer of fabric 61 is secured to the exterior of the intermediate layer 52 partially overlapping the chambers 54, 55 and 56. Seams are provided so that the layer 61 forms two chambers 62, 63. The chamber 62 is in communication with the aperture 60, and the chamber 63 is in communication with the aperture 59. It can be seen that on inflation of the airbag 50 as shown in FIG. 7, initially the chambers 53 to 58 will become inflated. As the chambers 54 and 55 become inflated, gas will flow through the apertures 59 and 60 into the chambers 62 and 63. In the embodiment a two-step gas generator may be used to provide inflating gas over a relatively long period of time.

It is to be appreciated that if the seams in any embodiment of the invention are relatively weak, energy may be absorbed, by the tearing of those seams, should the head of an occupant of a vehicle impact with the air-bag when it is inflated.

Whilst the invention has been described with reference to preferred embodiments, it is to be appreciated that many modifications may be effected. For example, whilst the invention has been described with reference to an embodiment in which the gas supply duct is provided at the top of the inflatable element, the gas supply duct may be provided at the lower edge of the inflatable element. The air-bag may be designed to extend over both a front and a rear door. Thus the air-bag may extend from a point on the A-Post to a point on the C-Post with no extension pieces or straps.

Again, whilst in the preferred embodiment of the invention, two gas ducts are provided, one supplying the first set of chambers and the other supplying the second set of chambers, it is to be appreciated that a single gas duct may be provided which inflates both sets of chambers simultaneously. Alternatively, a single gas supply duct may inflate one set of chambers and gas may then flow, for example through a permeable part of the intermediate layer, from part of that gas duct, or one of the inflated chambers into the second set of chambers.

Whilst, in the described embodiment, the second set of chambers comprises a broadly equivalent number of chambers to that of the first set of chambers, in modified embodiments of the invention there may only be a single chamber in the second set of chambers, or the second set of chambers may be constituted by a small number of chambers, or a number of small chambers.

Again, whilst the invention has been described with reference to an embodiment in which three layers of fabric are utilized to form the air-bag, in a modified embodiment of the invention of the air-bag could be formed from two layers of fabric forming an outer layer and an intermediate layer, and the other outer layer could be formed of a foil. The foil may be relatively thin layer formed, for example, of an appropriate plastics material. In an embodiment of this type of a plurality of layers of foil may be provided, thus providing three or more sets of chambers, with the chambers being mutual off-set. The seams, where a foil layer is used, may be ordinary stitching, or glued or welded seams may be used.

Figure 8:
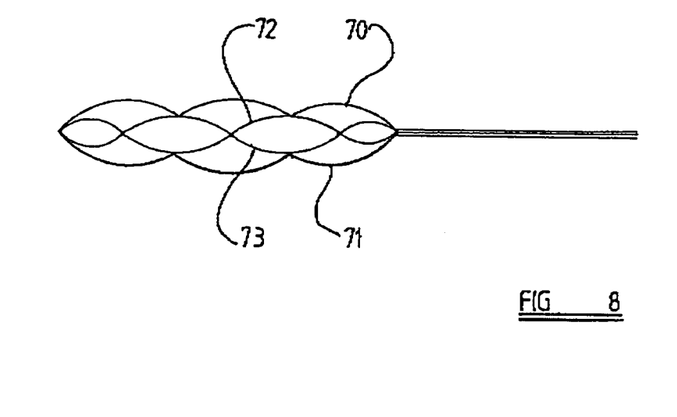
FIG. 8 is a sectional view of part of another modified embodiment of the invention.

FIG. 8 is a sectional view illustrating a further modified embodiment of the invention, the sectional view being equivalent to the left-hand part of FIG. 5. It can be seen that in this embodiment of the invention, there are two outer layers 70, 71, and two intermediate layers 72, 73. Thus, three chamber sets are formed, one chamber set being formed between the outer layer 70 and intermediate layer 72, a further chamber set being formed between the intermediate layer 72 and intermediate layer 73 and a third chamber set being formed between the intermediate layer 73 and the outer layer 71. The chambers formed by each outer layer are in alignment with each other, but the chambers formed between the two intermediate layers are off-set from these aligned chambers. It is to be appreciated that even more intermediate layers may be utilized, with the result that even more chamber sets are defined.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. An air-bag arrangement for use in a motor vehicle to provide protection for an occupant of the motor vehicle, the air-bag arrangement incorporating an air-bag adapted, on inflation, to be located adjacent an occupant of a vehicle, the air-bag comprising at least three super-imposed layers including a first outer layer, an intermediate layer and a second outer layer, each layer being formed of fabric and connected to the or each adjacent layer to define a respective chamber set where the intermediate layer is attached to both the first and second layers at locations where the first and second layers are connected, at least one of the chamber sets incorporating a plurality of chambers, the chambers of one chamber set being off-set relative to the chamber or chambers of another chamber set so as to substantially overlap the chamber or chambers of another chamber set and means being provided to supply gas to the chamber sets wherein the air-bag is fabricated using a one-piece weaving technique, and wherein the air-bag has an extension, the extension constituting a gas supply duct adapted to supply gas to at least one of the chamber sets.

2. An arrangement according to claim 1 wherein the first outer layer is connected to the intermediate layer to define a plurality of chambers constituting said one chamber set, and the second outer layer is connected to the intermediate layer to define at least one chamber forming a second chamber set.

3. An arrangement according to claim 1 wherein the gas supply duct is adapted to supply gas to one of the chamber sets.

4. An arrangement according to claim 3 wherein the extension additionally comprises a further gas duct to supply gas to a second chamber set.

5. An arrangement according to claim 3 wherein the means to supply gas to a chamber set comprise a region of the intermediate layer which is adapted to permit a flow of gas from a chamber set which is receiving gas to an adjacent chamber set which is to receive the gas.

6. An air-bag according to claim 5 wherein the intermediate layer is provided, within said region, with an aperture.

7. An air-bag according to claim 5 wherein the intermediate layer is permeable to high pressure gas within said region.

8. An arrangement according to claim 5 wherein the intermediate layer is adapted to rupture or break within said region when subjected to a high pressure of gas.

9. An arrangement according to claim 1 wherein the chambers of one chamber set are elongate and generally parallel.

10. An arrangement according to claim 9 wherein the chambers of a second chamber set are elongate and parallel and are off-set from the chambers of the first chamber set.

11. An arrangement according to claim 9 in which the air-bag is provided with fixing means adapted to fix the air-bag to part of a motor vehicle extending above the side doors of the vehicle, the chambers being located to extend generally transversely of an intended line of tension extending across part of the air-bag.

12. An arrangement according to claim 11, wherein the air-bag is provided with an extending strap adapted to be connected to an anchoring point on the vehicle, said line of tension extending from that anchoring point to one of said fixing means.

13. An arrangement according to claim 1 wherein the air-bag has a substantially rectangular portion accommodating said chamber sets and the extension.

14. An arrangement according to claim 1 wherein each of the said layers of fabric are of substantially identical shape and size.

15. A method of inflating an air-bag according to claim 1 comprising the steps of initially inflating a first chamber set, and subsequently inflating a second chamber set.

* * * * *